United States Patent [19]

Escaravage

[11] Patent Number: 4,726,537
[45] Date of Patent: Feb. 23, 1988

[54] SAFETY BELT STRAP WINDER

[75] Inventor: Gérard Escaravage, Valentigney, France

[73] Assignee: Aciers et Outillage Peugeot, Audincourt, France

[21] Appl. No.: 77,345

[22] Filed: Jul. 24, 1987

[30] Foreign Application Priority Data

Jul. 29, 1986 [FR] France ................................ 86 10974

[51] Int. Cl.⁴ ............................................. B60R 22/44
[52] U.S. Cl. ..................................... 242/107; 280/807
[58] Field of Search ......................... 242/107, 107.4 R; 280/803, 806, 807; 297/475; 180/268

[56] References Cited

U.S. PATENT DOCUMENTS

| 4,002,219 | 1/1977 | Steinmann | 242/107 X |
| 4,487,381 | 12/1984 | Kubota | 242/107 |
| 4,529,143 | 7/1985 | Kanada et al. | 242/107 |
| 4,588,144 | 5/1986 | Nishimura | 242/107 |
| 4,630,841 | 12/1986 | Nishimura et al. | 242/107 |
| 4,669,680 | 6/1987 | Nishimura et al. | 242/107 |

FOREIGN PATENT DOCUMENTS 2742676 4/1979 Fed. Rep. of Germany .
2304362 10/1976 France .

Primary Examiner—John M. Jillions
Attorney, Agent, or Firm—Sughrue, Mion, Zinn, Macpeak and Seas

[57] ABSTRACT

The winder is of the type comprising a support structure (1) in which is rotatively mounted a reel connected to safety and locking means for the strap (5) and to means (4) for returning the strap to the position in which it is wound on the reel. The return means comprise a cylindrical housing (6) which is mounted to be rotatable about the axis of rotation of the reel and in which is disposed a spiral spring (7) for putting the strap (5) under tension. The spring has one end fixed to the shaft of rotation of the reel and the other end mounted on the housing (6). The housing (6) cooperates with an intermediate pinion (10) which is meshed with a pinion (11) fixed to the output shaft of an electric motor (12). The motor and the intermediate pinion (10) are carried by a plate (13) which is mounted to be angularly movable about the axis of rotation of the reel between a position for deactivating the electric motor and a position for activating the latter, and therefore the winding of the strap on the reel, in response to a slackening of the tension imparted to the spring (7) by the strap (5).

11 Claims, 5 Drawing Figures

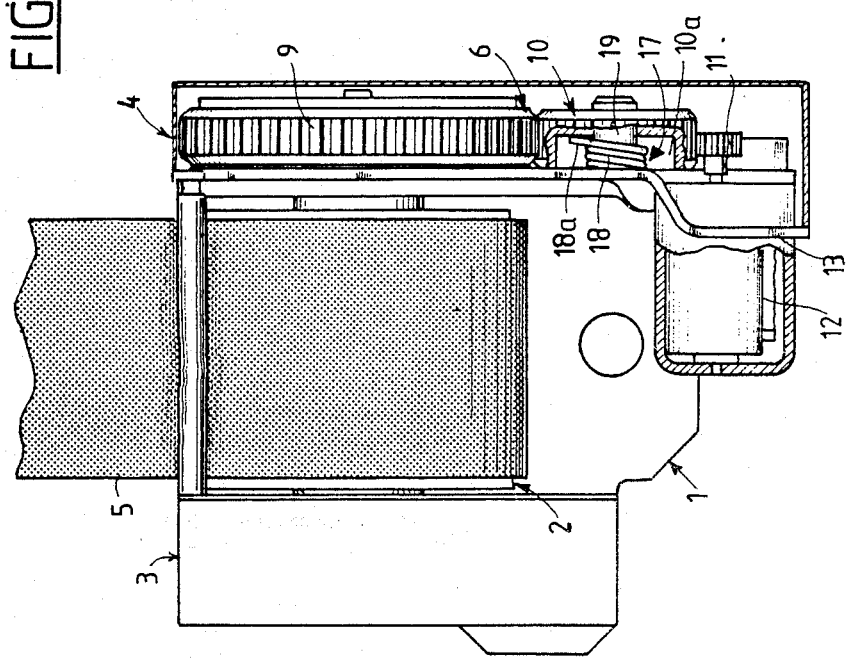
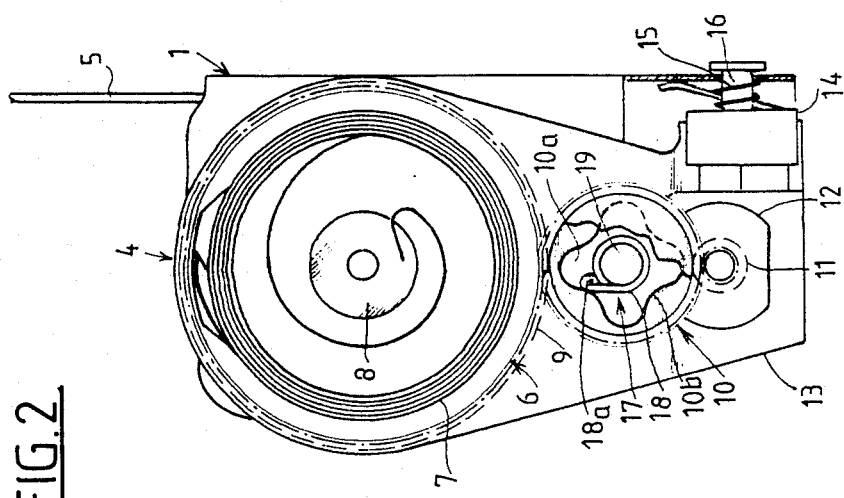

SAFETY BELT STRAP WINDER

The present invention relates to a winder of a safety belt strap of the type comprising a support structure in which is rotatively mounted a strap-carrying reel connected to the safety means and means for locking the strap and to means for returning the strap to a wound position on the reel.

In the prior art, the means for returning the strap to the wound position on the reel are constituted by a spiral spring, one of the ends of which is mounted on the support structure, whereas the other end is mounted on the strap-carrying reel so as to wind this strap around the reel when it is released.

This return spring is adapted to wind the whole of the strap onto the reel. For this purpose, the spring is pre-stressed when mounting the winder, and this pre-stressing is manifested, for the user, by an increasing force to be exerted on the strap for uwinding the latter and by a discomfort due to the tension exerted by the spring on the strap when the latter is hooked.

A winder-unwinder is also known from the document FR. No. 2 422 413 for a safety belt strap comprising an electric motor. This electric motor permits both the winding of the strap onto the reel and the maintenance thereof under tension against the body of the user. In this device, the electric current supplied to the motor has a lower intensity when the belt buckle is closed than when it is open.

However, this device has a number of drawbacks, in partiuclar as concerns the supply of power to this motor.

An object of the invention is therefore to remedy the aforementioned problems while affording the user an improved comfort by minimizing the force required to extract the strap and controlling the pressure exerted by the strap on the user in the hooked position of the strap.

The invention therefore provides a safety belt strap winder of the type comprising a support structure in which is rotatively mounted a strap-carrying reel connected to safety and strap locking means and to means for returning the strap to the wound position on the reel, wherein the return means comprise a cylindrical housing mounted to be rotatable about the axis of said reel, and in which is disposed a spiral spring for putting the strap under tension and having one end fixed to the rotatable shaft of the reel and the other end mounted on the housing, said housing comprising on its outer periphery gear means cooperative with an intermediate gear pinion which is meshed with a gear pinion fixed to the output shaft of an electric motor, the electric motor and the intermediate pinion being carried by a plate which is mounted to be angularly movable about the axis of the reel between a position of deactivation of the electric motor and a position of activation of the electric motor and therefore of the winding of the strap onto the reel, toward which the plate is elastically biased in opposition to a force exerted thereon by the tension of the strap through the spiral spring and the housing, in response to a decrease in the tension imparted to the spring by the strap.

A better understanding of the invention will be had from the following description which is given solely by way of example with reference to the accompanying drawings, in which:

FIG. 1 is a front elevational view of a device according to the invention in which some elements have been shown in partial section for reasons of clarity;

FIG. 2 is a side elevatioal view of a device according to the invention, and

Figure 5:
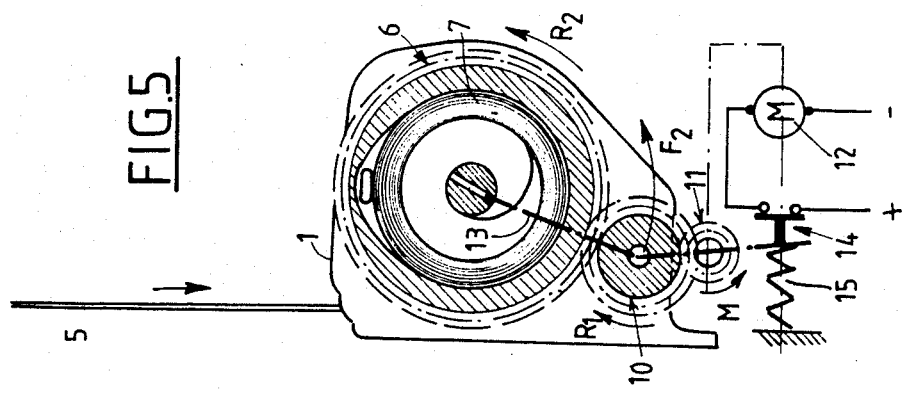
FIGS. 3, 4 and 5 illustrate the operation of a device according to the invention.

As can be seen in FIGS. 1 and 2, a safety belt strap winder comprises a support structure 1 in which is rotatively mounted a strap-carrying reel 2 connected to known safety and strap locking means 3 and to means 4 for returning the strap 5 to the position in which it is wound onto the reel 2.

These return means 4 comprise a cylindrical housing 6 mounted to be rotatable about the axis of said reel 2, and in which is disposed a spiral spring 7 for putting the strap under tension and having one end fixed to the rotatable shaft 8 of the reel and the outer end mounted on the housing 6. This housing 6 includes on its outer periphery gear means 9 cooperative with an intermediate gear pinion 10 which is meshed with a gear pinion 11 fixed to the output shaft of an electric motor 12.

The electric motor 12 and the intermediate pinion 10 are carried by a plate 13 which is mounted to be angularly movable about the axis of the reel 2 between a position for deactivating the electric motor 12 and a position for activating the latter, as will be explained hereinafter.

This control of the electric motor 12 is realized be means of a push-button 14 controlling the supply of the motor which is actuated by the plate 13 as a function of the movements of the latter relative to the reel, and therefore to the support structure 1.

It must also be noted that the plate 13 is biased to the position thereof for activating the motor by a spring 15 which has one end cooperative with the support structure 1, and the other end with the plate 13, this spring 15 being disposed around a pin 16 limiting the movement of the plate.

The device according to the invention further comprises means for braking the rotation of the housing 6. These braking means are advantageously constituted by means 17 for braking the rotation of the intermediate gear pinion 10. These braking means 17 are, for example, constituted by a coil spring 18 disposed around a stud 19 fixed to the plate and on which is rotatively mounted the intermediate pinion. The end, 18a, of the spring 18 projects into a central recess 10a of the pinion 10, and cooperates with abutment means formed in this recess for braking the rotation of the pinion.

In the represented embodiment, these abutment means are constituted by at least one boss 10b of the intermediate pinion extending toward the axis of rotation of the latter.

This boss therefore cooperates with the end of the spring so as to brake the rotation of the intermediate pinion 10 and of the housing 6 by tightening the spring 18 around the stud 19 inthe direction of an unwinding of the strap.

It should also be noted that, when the intermediate pinion has a tendency to rotate in the opposite direction, the boss also cooperates with the end of the spring so as to relieve the latter and permit a rotation of the assembly around the stud, the spring exerting nonetheless a small braking force on the intermediate pinion owing to the friction of this spring on the stud.

In the represented embodiment, the intermediate pinion includes four bosses having the same size and adapted to exert a constant braking force on the intermediate pinion in the direction of an unwinding of the strap. Indeed, when the spring 7 is completely unwound around its axis and the pull exerted on the strap becomes excessive, the end 16a of the spring is so deformed as to allow the bosses of the intermediate pinion to pass and therefore to permit its rotation and the rotations of the housing and the strap-carrying reel in the direction of an unwinding of the strap until the latter is in the hooked position and/or the pull exerted on the strap is insufficient to result in a deformation of this end 18a of the spring 18.

According to another embodiment (not shown), the spring and/or the abutment means are so dimensioned as to exert an increasing braking force on the intermediate pinion as a function of the rotation of the latter. This, for example, the bosses may be dimensioned in such manner as to be different so that the more the intermediate pinion rotates about the stud 19, and therefore the spring 18 locked on the latter, the more it becomes difficult for the bosses to pass beyond the end 18a of the spring, which is manifested for the user by an increasing force to be exerted to totally extract the strap, which is usually unnecessary.

Figure 4:
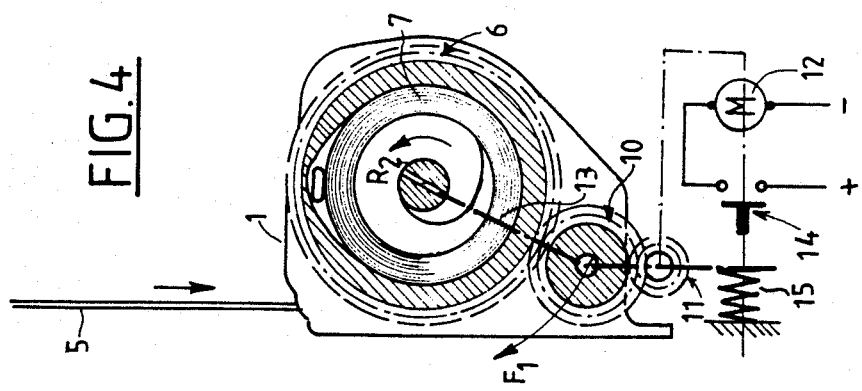

The operation of such a device will now be described with reference to FIGS. 3, 4 and 5 in which the plate 13 has been diagrammatically represented by a dot-dash line and the supply means of the motor have been represented diagrammatically for reasons of clearness.

Figure 3:
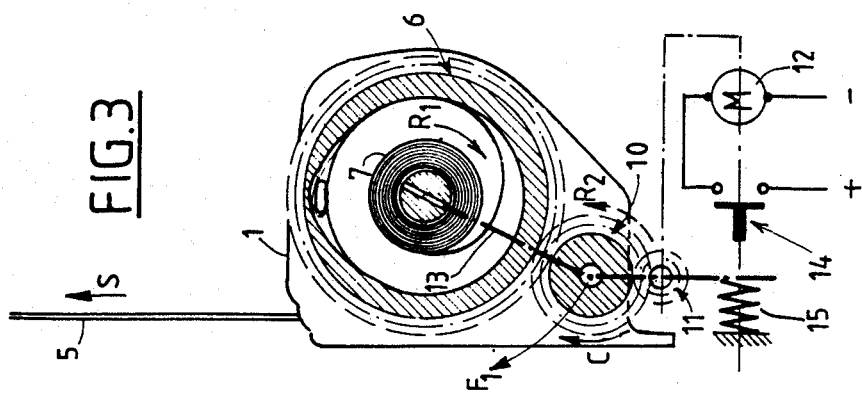

In FIG. 3, which illustrates a stage of the unwinding of the strap for bringing the bolt of the latter in facing relation to the buckle for its hooking, a force S is exerted on the strap, which results in a rotation in the direction R1 of the reel of the winder. The spiral spring 7, connected at one of its ends to this reel and at its other end to the housing 6, is wound under stress around its axis since, as described before, the intermediate pinion 10 includes means for braking its rotation and therefore that of the housing, when the belt is being unwound. These braking means therefore create a resistant torque C oppposing the force tending to drive the intermediate pinion 10 in rotation in the direction R2, this resisting torque being if desired constant or increasing as a function of the unwinding of the belt, as mentioned before.

As the housing 6 is biased to rotate in the direction R1 by the spiral spring 7 and the intermediate pinion 10 is prevented from rotating relative to the housing 6, the plate 13, on which the intermediate pinion 10 is mounted, is then biased in the direction F1, entraining along therewith the motor 12 and the pinion 11 integral with the output shaft of the latter, toward its position for deactivating the electric motor in which the force exerted by the spring 15, biasing the plate 13 to its position for activating the electric motor 12, is less than the force exerted on the plate by the strap 5 through the spiral spring 7, the housing 6 and the intermediate pinion 10.

When the spring 7 is completely wound around its axis, the stress exerted on the intermediate pinion in the direction R1 becomes greater than the value of the resisting torque C exerted on the intermediate pinion by the previously described braking means. The latter then allow a rotation of the intermediate pinion about its axis resulting in a rotation of the pinion 11 and of the housing 6 in such manner as to permit a complete unwinding of the strap.

When the bolt is hooked into the buckle, the strap is released. It is therefore necessary at this instant to rewind the excess strap so as to put the latter under sufficient tension to ensure its safety function without hindering the user.

As the strap is slackened, the reel is subjected to the force exerted by the spring 7 wound in the preceding stage around its axis. The spring 7 therefore is released and drives in rotation in the direction R2 (FIG. 4) the reel, the housing 6 being still braked against rotation by the intermediate pinion 10. During this operation, the plate 13 is still biased in the direction F1 to its position for deactivating the electric motor. The winding of the belt continues until the tension of the belt is balanced with the force exerted on the reel by the spring 7.

When the bolt is withdrawn from the buckle, the strap must be completely re-wound around the reel. Thus, as shown in FIG. 5, the strap is completely slackened, which results in the complete release of the spiral spring 7. The intermediate pinion 10 and the plate 13 are consequently no longer biaised in the direction F1 to the position for deactivating the motor by the housing 6, but, on the contrary, the action in the direction F2 of the spring 15 causes a displacement of the plate 13 and therefore of the intermediate pinion 10 and the pinion 11, to the position for activating the electric motor by means of the push-button 14 which is then closed. As the electric supply contact of the electric motor is established, this motor is caused to rotate in the direction M resulting in a rotation in the direction R1 of the intermediate pinion 10 and a rotation in the direction R2 of the housing 6 about the axis of the reel. The transmission of this movement of rotation between the housing 6 and the strap-carrying reel for winding the strap occurs through the spiral spring 7 which, for example, when the strap is completely wound onto the reel, is put under stress and causes a displacement of the intermediate pinion 10 relative to the housing 6 bringing about in this way a displacement of the plate 13 toward the position for deactivating the electric motor.

Thus, it can be seen that the spiral spring 7 constitutes only means for putting the strap under tension and no longer means for effecting the complete winding of the latter onto the reel, this function being performed by the electric motor 12, the pinion 11, the intermediate pinion 10, the housing 6 and the spiral spring 7.

The spiral spring 7 may therefore be reduced relative to springs of known devices, so that the tension exerted by the latter on the strap is mush less of a hindrance to the user.

It will be understood that embodiments other than the means for actuating the push-button of the motor may be envisaged. Thus, for example, there may be employed a spring operating under compression for biasing the plate toward its position for actuating the electric motor, and the push-button may be fixed to the support structure and not to the plate, as is illustrated.

What is claimed is:

1. A safety belt strap winder comprising a support structure, a strap-carrying reel mounted in the support structure to rotate about an axis, safety and strap locking means connected to the reel and return means connected to the reel for rotating the reel and returning the strap to a position wound on the reel, the return means comprising a shaft integral with and coaxial with the reel, a cylindrical housing mounted in the support structure to rotate about said axis of rotation of the reel, a spiral spring disposed in the housing for putting the strap under tension and having an end fixed to said shaft of the reel and an opposite end mounted on the housing, a plate, an electric motor having an output shaft and mounted on said plate, the housing having an outer periphery, gear teeth provided on said outer periphery, an intermediate gear pinion rotatively mounted on said plate, a gear pinion fixed to the output shaft of the electric motor, the intermediate gear pinion being meshed with said gear teeth on the housing and meshed with the gear pinion fixed to the output shaft of the electric motor, the plate being mounted to be movable about said axis of rotation of the reel between a position for deactivating the electric motor and a position for activating the electric motor and therefore effecting the winding of the strap on the reel, elastic means for elastically biasing the plate toward said activating position in opposition to a force exerted on the plate by the tension of the strap, through the spiral spring and the housing, in response to a slackening of the tension imparted to the spring by the strap.

2. A winder according to claim 1, comprising means for braking the rotation of the housing.

3. A winder according to claim 2, wherein said braking means comprise means for braking the rotation of the intermediate pinion.

4. A winder according to claim 3, wherein said braking means comprise a stud fixed to the plate and carrying the intermediate pinion which is rotatable on the stud and includes a central recess containing abutment means formed therein, a coil spring disposed around the stud, the coil spring having an end portion projecting into the central recess in the intermediate pinion and cooperative with the abutment means formed in said recess for braking the rotation of the intermediate pinion.

5. A winder according to claim 4, wherein the abutment means comprise at least one boss extending toward the axis of rotation of the intermediate pinion.

6. A winder according to claim 4, wherein the coil spring is so dimensioned as to exert a constant braking force on the intermediate pinion in the direction of the unwinding of the strap.

7. A winder according to claim 4, wherein the abutment means are so dimensioned as to exert a constant braking force on the intermediate pinion in the direction of the unwinding of the strap.

8. A winder according to claim 4, wherein said coil spring is so dimensioned as to exert an increasing braking force on the intermediate pinion as a function of the rotation of the intermediate pinion in the direction of the unwinding of the strap.

9. A winder according to claim 4, wherein said abutment means are so dimensioned as to exert a constant braking force on the intermediate pinion as a function of the rotation of the intermediate pinion in the direction of the unwinding of the strap.

10. A winder according to claim 1, wherein said elastic means for biasing the plate to its position for activating the electric motor comprise a spring having an end which is cooperative with the support structure and an opposite end cooperative with the plate.

11. A winder according to claim 1, comprising a push-button for controlling supply of power to the motor and cooperative with the plate to be controlled by the plate as a function of the movements of the plate.

* * * * *